US009514118B2

(12) United States Patent
New

(10) Patent No.: US 9,514,118 B2
(45) Date of Patent: Dec. 6, 2016

(54) METHOD, SYSTEM AND COMPUTER PROGRAM FOR GENERATING ELECTRONIC CHECKLISTS

(71) Applicant: YOKOGAWA ELECTRIC CORPORATION, Musashino-shi, Tokyo (JP)

(72) Inventor: Ren Jie New, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 402 days.

(21) Appl. No.: 14/307,742

(22) Filed: Jun. 18, 2014

(65) Prior Publication Data

US 2015/0370776 A1 Dec. 24, 2015

(51) Int. Cl.

| | |
|---|---|
| ***G06F 17/24*** | (2006.01) |
| ***G06F 3/0482*** | (2013.01) |
| ***G06F 3/0484*** | (2013.01) |
| *G06F 17/22* | (2006.01) |
| *G06F 17/21* | (2006.01) |
| *G06Q 10/06* | (2012.01) |

(52) U.S. Cl.

CPC ........... *G06F 17/248* (2013.01); *G06F 3/0482* (2013.01); *G06F 3/04842* (2013.01); *G06F 17/2247* (2013.01); *G06F 17/218* (2013.01); *G06F 17/2252* (2013.01); *G06Q 10/063114* (2013.01)

(58) Field of Classification Search

CPC .. G06F 17/248; G06F 3/0482; G06F 17/2252; G06F 17/218; G06F 3/04842; G06F 17/2247

See application file for complete search history.

(56) References Cited

U.S. PATENT DOCUMENTS 5,907,851 A * 5/1999 Yamakawa ......... G06F 17/2229 715/205
6,093,215 A * 7/2000 Buxton ..................... G06F 8/61 717/104
6,182,092 B1 * 1/2001 Francis ............... G06F 17/2247 707/E17.006
6,496,832 B2 * 12/2002 Chi ....................... G06F 17/246
6,519,763 B1 * 2/2003 Kaufer ................ G06Q 10/109 706/21

(Continued)

*Primary Examiner* — Shen Shiau
(74) *Attorney, Agent, or Firm* — Westerman, Hattori, Daniels & Adrian, LLP

(57) ABSTRACT

The invention comprises a method, system and computer program for database implementation of electronic checklists. The invention implements using at least one processor, the steps of (i) displaying at a user interface, a first electronic checklist template within a template editor (ii) defining a modified electronic checklist template, wherein defining the modified electronic checklist template comprises modifying the first electronic checklist template based on inputs received at the template editor; and (iii) generating a database implemented electronic checklist template. The database implemented electronic checklist template may comprise a markup language encoding of the modified electronic checklist template and at least one system controlled column. Data input within data fields of the at least one system controlled column may be determined by one or more system information parameters, and one or more predefined rules of system behaviour associated with the at least one system controlled column.

19 Claims, 14 Drawing Sheets

(56) References Cited

U.S. PATENT DOCUMENTS 6,671,854 B1 * 12/2003 Dunsmoir ........... G06F 17/2247 707/999.101
7,168,035 B1 * 1/2007 Bell .................... G06F 17/2247 715/234
7,174,506 B1 * 2/2007 Dunsmoir ......... G06F 17/30899 707/E17.116
7,370,271 B2 * 5/2008 Killen ................... G06F 17/246 715/212
7,415,664 B2 * 8/2008 Aureglia ............... G06F 17/246 715/212
7,594,183 B2 * 9/2009 Dreher ................... G06Q 10/06 715/210
7,647,553 B2 * 1/2010 Mogilevsky .......... G06F 17/212 715/234
7,840,891 B1 * 11/2010 Yu ....................... G06F 17/2288 715/223
8,051,373 B2 * 11/2011 Rothschiller ....... G06F 17/2247 707/999.102
8,527,870 B2 9/2013 Elkady
2002/0065846 A1 * 5/2002 Ogawa .................. G06F 17/246 715/205
2002/0091818 A1 * 7/2002 Cascio .............. G06F 17/30516 709/224
2002/0156808 A1 * 10/2002 Duffy .................... G06F 17/243 715/234
2003/0028562 A1 * 2/2003 Shaughnessy ........ G06F 17/243 715/234
2003/0221162 A1 * 11/2003 Sridhar ............. G06F 17/30398 715/229
2004/0010753 A1 * 1/2004 Salter .................. G06F 17/2247 715/239
2004/0030701 A1 * 2/2004 Vandersluis ............ H04L 12/66
2004/0049737 A1 * 3/2004 Hunt ................. G06F 17/30905 715/238
2004/0059510 A1 3/2004 Thompson et al.
2004/0088650 A1 * 5/2004 Killen ................... G06F 17/246 715/213
2004/0153465 A1 * 8/2004 Singleton .............. G06F 17/248
2004/0172616 A1 * 9/2004 Rothschiller ....... G06F 17/2247 717/114
2005/0004885 A1 * 1/2005 Pandian ............ G06F 17/30557
2005/0015379 A1 * 1/2005 Aureglia ............... G06F 17/246
2005/0125728 A1 * 6/2005 Peiro ................... G06F 17/2264 715/235
2005/0188323 A1 * 8/2005 Shibata ................. G06F 17/248 715/760
2006/0048096 A1 3/2006 Jiang et al.
2006/0242180 A1 * 10/2006 Graf .................. G06F 17/30917
2006/0247964 A1 * 11/2006 Baturytski .......... G06F 11/3664 705/7.13
2006/0259524 A1 * 11/2006 Horton .................... G06F 17/24
2006/0288268 A1 * 12/2006 Srinivasan ............ G06F 17/245 715/210
2007/0061487 A1 * 3/2007 Moore ............. G06F 17/30575 709/246
2009/0031206 A1 * 1/2009 Aureglia ............... G06F 17/246 715/217
2009/0125529 A1 * 5/2009 Vydiswaran ...... G06F 17/30864
2009/0198714 A1 * 8/2009 Wake ................ G06F 17/30961
2009/0222718 A1 * 9/2009 Wagner ................. G06F 17/245 715/227
2009/0265339 A1 * 10/2009 Chen ................... G06F 17/2785
2011/0010612 A1 * 1/2011 Thorpe ............ G06F 17/30899 715/234
2011/0040390 A1 * 2/2011 Blevins ............. G05B 19/0426 700/18
2012/0173969 A1 * 7/2012 Schmid ................. G06F 17/248 715/246
2012/0185425 A1 * 7/2012 Reeves ............ G06F 17/30592 707/600
2012/0310868 A1 * 12/2012 Martins ............ G06F 17/30616 706/12
2012/0311426 A1 * 12/2012 Desai .................. G06F 17/2705 715/227
2014/0040198 A1 2/2014 Kernke et al.
2014/0122535 A1 * 5/2014 Gerard .................... G06F 17/30 707/802
2014/0129597 A1 * 5/2014 Dong .................. G06F 17/2229 707/803
2014/0348396 A1 * 11/2014 Laaser .............. G06K 9/00442 382/113
2015/0331846 A1 * 11/2015 Guggilla ............. G06F 17/2705 704/9

* cited by examiner

| <No>Sequence No. (C1) | <Checkitems>PSSR Check items (C2) | <Category> (C3) | <Status:list>judgment (C4) | <Priority:list>Severity (C5) | <L3:list> (C6) | <L4:list> (C7) | <Comment:text>Corrective Actions (C8) | <T2:text>Responsibility (C9) | <T3:text> (C10) | <T4:text> (C11) |
|---|---|---|---|---|---|---|---|---|---|---|
| SH1 <Section> Rotating Equipment | | | | | | | | | | |
| 1 | Have special precautions for safe operation been adequately specified? | HSE | | | | | | | | |
| 2 | If new lubricants or buffer fluids have been introduced have MSDS's been provided? | Maintenance | | | | | | | | |
| | Do provisions exist for cleanup, isolation, and lockout of equipment to perform maintenance? | HSE | | | | | | | | |
| 3 | Have inspection, test, and preventive maintenance provisions been made? | HSE | | | | | | | | |
| 4 | Are capacities of lifting equipment, floors, and hoists clearly displayed and visible to the operator? | HSE | | | | | | | | |
| SH2 <Section> Electrical | | | | | | | | | | |
| 1 | Have start/stop switches and electrical switch gear been properly labeled? | HSE | | | | | | | | |
| 2 | Can electrical equipment be isolated safely for repair work? | Operation | | | | | | | | |
| 3 | Do lockout provisions exist both at the switchgear and at the start/stop switch? | Operation | | | | | | | | |
| 4 | Have conduit fittings been properly sealed? | Operation | | | | | | | | |
| SH3 <Section>Waste Stream and Environment | | | | | | | | | | |
| 1 | Are all display screens, dials, and START/STOP/EMERGENCY buttons positioned so that they are easily seen and accessible by those who will operate the equipment or machine? | HSE | | | | | | | | |
| 2 | Have visual display screens been positioned so that interference from glare is reduced to the minimum? | HSE | | | | | | | | |
| 3 | Have all health risks due to gases, liquids, dusts, mists or vapors used by contained in or emitted by equipment been assessed, and where necessary, eliminated or adequately controlled? | HSE | | | | | | | | |
| DDL1 <Options:4:Status> | [Blank]<Default> | Pass | Fail | Not applicable | | | | | | |
| DDL2 <Options:4:Priority> | [Blank] | High | Medium<Default> | Low | | | | | | |

S1, S2, S3, DDEF

FIGURE 2

| | C1 | C2 | C3 | C4 | C5 | C6 | C7 | C8 | C9 | C10 | C11 | C12 | C13 |
|---|---|---|---|---|---|---|---|---|---|---|---|---|---|
| | <No>Sequence No. | <Checkitems>PSSR Check items | <Category> | <Status:list> judgment | <Priority:list> Severity | <L3: list> | <L4: list> | <Comment: text>Corrective Actions | <T2:text >Responsibility | <T3:text> | <T4:text> | <Modified By>Modified By | <Modified Date>Modified Date |
| SH1 | <Section> Rotating Equipment | | | | | | | | | | | | |
| S1 | 1 | Have special precautions for safe operation been adequately specified? | HSE | | | | | | | | | | |
| S1 | 2 | If new lubricants or buffer fluids have been introduced have MSDS's been provided? | Maintenance | | | | | | | | | | |
| S1 | | Do provisions exist for cleanup, isolation, and lockout of equipment to perform maintenance? | HSE | | | | | | | | | | |
| S1 | 3 | Have inspection, test, and preventive maintenance provisions been made? | HSE | | | | | | | | | | |
| S1 | 4 | Are capacities of lifting equipment, floors, and hoists clearly displayed and visible to the operator? | HSE | | | | | | | | | | |
| SH2 | <Section> Electrical | | | | | | | | | | | | |
| S2 | 1 | Have start/stop switches and electrical switch gear been properly labeled? | HSE | | | | | | | | | | |
| S2 | 2 | Can electrical equipment be isolated safely for repair work? | Operation | | | | | | | | | | |
| S2 | 3 | Do lockout provisions exist both at the switchgear and at the start/stop switch? | Operation | | | | | | | | | | |
| S2 | 4 | Have conduit fittings been properly sealed? | Operation | | | | | | | | | | |
| SH3 | <Section> Waste Stream and Environment | | | | | | | | | | | | |
| S3 | 1 | Are all display screens, dials, and START/STOP/EMERGENCY buttons positioned so that they are easily seen and accessible by those who will operate the equipment or machine? | HSE | | | | | | | | | | |
| S3 | 2 | Have visual display screens been positioned so that interference from glare is reduced to the minimum? | HSE | | | | | | | | | | |
| S3 | 3 | Have all health risks due to gases, liquids, dusts, mists or vapors used by contained in or emitted by equipment been assessed, and where necessary, eliminated or adequately controlled? | HSE | | | | | | | | | | |
| DDL1 | <Options:4:Status> | [Blank]<Default> | Pass | Fail | Not applicable | | | | | | | | |
| DDEF / DDL2 | <Options:3:Priority> | High | Medium<Default> | Low | | | | | | | | | |

FIGURE 2A

| <No.> | <Checkitems> | <Category> | <L1:list> | <L2:list> | <L3:list> | <L4:list> | <T1:text> | <T2:text> | <T3:text> | <T4:text> | <ModifiedBy> | <ModifiedDate> |
|---|---|---|---|---|---|---|---|---|---|---|---|---|
| | | | | | | | | | | | | |
| <Section> | | | | | | | | | | | | |
| | | | | | | | | | | | | |
| | | | | | | | | | | | | |
| | | | | | | | | | | | | |
| | | | | | | | | | | | | |
| <Section> | | | | | | | | | | | | |
| | | | | | | | | | | | | |
| | | | | | | | | | | | | |
| | | | | | | | | | | | | |
| | | | | | | | | | | | | |
| <Options:4:L1> | <Default>Pass | Pass | Fail | Not applicable | | | | | | | | |
| <Options:2:L2> | High | <Default>M edium | Low | | | | | | | | | |

FIGURE 5C

METHOD, SYSTEM AND COMPUTER PROGRAM FOR GENERATING ELECTRONIC CHECKLISTS

FIELD OF THE INVENTION

The present invention relates to the field of task organization and management. In particular, the invention relates to methods, apparatuses and computer program products for generating templates for database implemented electronic checklists and electronic checklists based on such templates.

BACKGROUND

A checklist comprises a record of event data corresponding to a plurality of event heads under consideration. Checklists may be used to record information verifying or assessing performance of one or more tasks within a process, and serve as informational aids which reduce likelihood of error or failure. Employing checklists in task management offers multiple advantages, for creating, scheduling or managing a list of tasks or actions, including ensuring consistency and completeness in execution, enabling delegation or supervision, and statistical treatment of task performance data. Currently checklists are widely used across in various domains, including without limitation industrial automation, medicine and pharmaceuticals, sports and games, aviation industry, manufacturing and packaging, software and information technology.

It has been observed that organizations use multiple checklists, and that checklists for each task or domain typically tend to have a different format and are designed to record differing content. Additionally, while organizations rely extensively on checklist assessments, the checklists in use are often paper based, or in some cases are electronic checklists which implement data entry and data storage by way of word processing application software or spreadsheet application software. Data entry using paper based checklists or such electronic checklists has therefore been found to result in a large number of discrete collections of checklist data, which is unconsolidated and therefore difficult to evaluate from an organizational perspective. Other disadvantages include difficulty in aggregating, analysing, and controlling data. Such checklists offer limited user interactivity and also limited flexibility in customization.

The advantages of electronic checklists implemented using database systems are therefore apparent. US 2004/0059510 teaches a reporting system for orderly accumulation of safety system test data that can be used for operational analyses, reliability studies, and reports that may be required by regulatory agencies, A user may input appropriate platform-specific testing/compliance data into a web page that is essentially an operational model of each user's production and safety processes on that specific platform.

Despite the advantages of implementing electronic checklists on database systems, porting existing paper based or non-database electronic checklists to a database system has not been widely implemented, since the process requires time, effort, and specific coding skills. By way of example, US20140040198 teaches changing data entry templates using MS excel and propagating the changed templates to all machines that will use the template. This technique however involves changing the format of previously stored data records, which involves database manipulation knowledge and skills.

Similarly, while U.S. Pat. No. 8,527,870 teaches generation of a unified electronic data format template, based on pre-existing templates, the prior art reference requires embedding of logic/coding within a first electronic format, which is then converted into a unified electronic data format template.

There is accordingly a need for generating electronic checklist templates and database implemented electronic checklists based on pre-existing non-database implemented checklists, which can be by modified or customized without specialized programming or coding expertise.

SUMMARY

The invention comprises a method, system and computer program for database implementation of electronic checklists.

The method of the present invention comprises implementing using at least one processor, the steps of (i) displaying at a user interface, a first electronic checklist template within a template editor (ii) defining a modified electronic checklist template, wherein defining the modified electronic checklist template comprises modifying the first electronic checklist template based on inputs received at the template editor; and (iii) generating a database implemented electronic checklist template.

The database implemented electronic checklist template may comprise a markup language encoding of the modified electronic checklist template and at least one system controlled column. Data input within data fields of the at least one system controlled column may be determined by one or more system information parameters, and one or more predefined rules of system behaviour associated with the at least one system controlled column.

In an embodiment, the first electronic checklist template may comprise checklist definition information extracted from a pre-existing checklist template.

In another embodiment, the method may include selecting for inclusion within the modified electronic checklist, a system controlled column within the first electronic checklist template—said system controlled column having one or more predefined rules of system behaviour associated therewith.

Generating the database implemented electronic checklist template may comprise (i) parsing content of the modified electronic checklist template, (ii) generating a markup language encoded checklist template comprising columns and column descriptors corresponding to columns and column descriptors parsed from the modified electronic checklist template, and (iii) for each checklist item parsed from the modified electronic checklist template, adding a template row to the markup language encoded checklist template and populating the added template row with data fields extracted from the parsed checklist item.

In a specific embodiment, generating the database implemented electronic checklist template may comprise (i)for each section defined in the modified electronic checklist template, adding a merged row to the markup language encoded checklist template, and setting content of the merged row to a corresponding section title parsed from the modified electronic checklist template, (ii) for each drop down list defined in the modified electronic checklist template, generating a drop down list control object and populating the drop down list control object with corresponding drop down options parsed from the modified electronic checklist template, or (iii) selecting a system controlled column for inclusion within the modified electronic checklist template, and associating predefined rules of system behaviour with said system controlled column.

In another embodiment, generating the database implemented electronic checklist template may comprise configuring at least one data field corresponding to a system controlled column within the markup language encoded checklist template, to respond to a predefined event trigger by implementing a predefined system behaviour determined by one or more predefined rules of system behaviour associated with the at least one data field.

For the purposes of the invention, system information parameters determining data input within data fields of the at least one system controlled column may include at least one of, identity of a user updating a checklist item data field, date of modification of a checklist item data field, and time of modification of a checklist item data field.

The predefined system behaviour of the present invention may comprise one or more of (i) responding to input seeking to assign responsibility for a checklist item, by displaying to the assigning user, a drop down list of selectable assignees, (ii) responding to input generated predefined event trigger by generating a corresponding event notification to one or more recipients, (iii) responding to input generated predefined event trigger by assigning responsibility for a specific checklist item to a specified assignee, or (iv) responding to input received from the user interface for a checklist item, by executing a data validation check in connection with data submitted by said input, and wherein the data validation check is based on one or more predefined data validation rules associated with the checklist item.

The invention may additionally comprise responding to input requesting a checklist instance of the database implemented electronic checklist template by (i) retrieving checklist definition information corresponding to the database implemented electronic checklist template, (ii) retrieving one or more predefined rules of system behaviour associated with all system controlled columns within the database implemented electronic checklist template, and (iii) generating a checklist instance for display at the user interface based on the retrieved checklist definition information—wherein data input within data fields of each system controlled column within the displayed checklist instance is controlled by the retrieved predefined rules of system behaviour associated with said system controlled column.

The invention additionally includes a system and a computer program product implementing the various method limitations described above, and in greater detail hereafter.

BRIEF DESCRIPTION OF THE ACCOMPANYING DRAWINGS

FIGS. 2 and 2A illustrate exemplary modified electronic checklist templates.

FIG. 5C illustrates an exemplary blank electronic checklist template.

DETAILED DESCRIPTION

The present invention enables generation of database implemented electronic checklists, based on pre-existing non-database checklists. The invention additionally enables generation of platform neutral electronic checklists that are capable of network delivery to a client terminal for obtaining user inputs. The term "input" used in the description may include input by user or by any other means. The invention also enables storage and retrieval of electronic checklists and input data corresponding to such electronic checklists.

Figure 1:
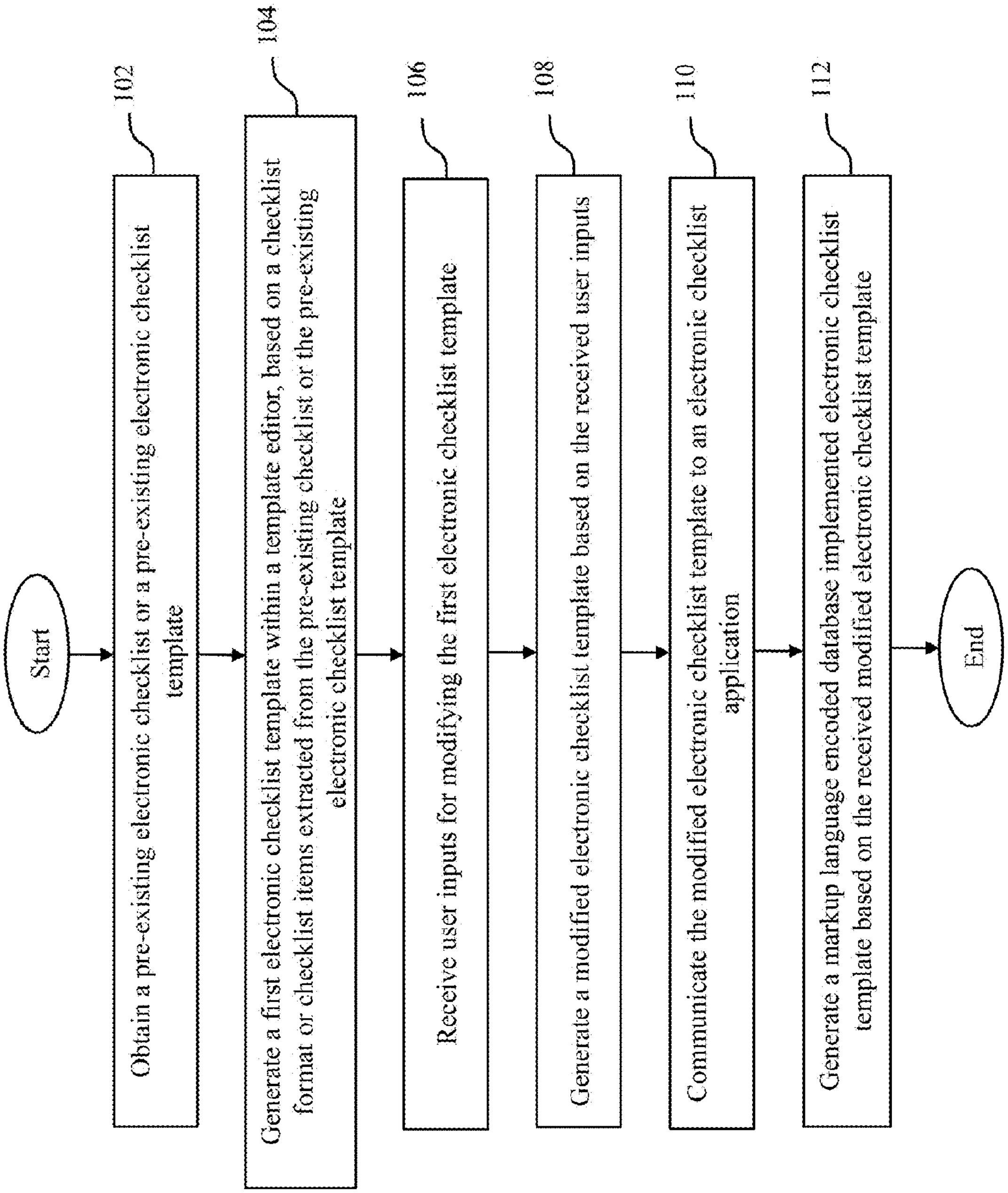
FIG. 1 illustrates a method for generating a database implemented electronic checklist template.

FIG. 1 illustrates a method for defining and thereafter generating a database implemented electronic checklist template. For the purposes of the present invention, it will be understood that structure and format of an electronic checklist template may be defined using a template editor application software (henceforth "template editor"), such as but not limited, to Microsoft Word®, Microsoft Excel® or any other document or spreadsheet application software.

At step 102, the template editor obtains or receives a pre-existing checklist. The pre-existing checklist may comprise a pre-existing non-database electronic checklist, or a paper checklist which has been digitized (for example by scanning, and use of optical character recognition technology), or from a pre-existing electronic checklist or a pre-existing electronic checklist template. Non-database electronic checklists may include checklists created in a document or spreadsheet application software (such as in Microsoft Word® or Microsoft Excel®). In an embodiment of the invention a user may copy into the template editor individual columns and/or rows from a pre-existing electronic checklist or pre-existing electronic checklist template. In a particular embodiment, a user may copy and paste an entire pre-existing electronic checklist or pre-existing electronic checklist template (or specific portion thereof) into the template editor.

At step 104 a first electronic checklist template is generated within the template editor based on checklist definition information extracted from the pre-existing electronic checklist or pre-existing electronic checklist template—wherein checklist definition information may include information defining structure of a checklist, checklist items within a checklist, or rules associated with data input, data output, or other behaviour of a data field within a checklist. In an embodiment, one or more columns of the first electronic checklist template correspond to one or more columns of the pre-existing checklist. In a more particular embodiment, column formats and column descriptors of the first electronic checklist template may be identical or substantially identical to the respective column formats and column descriptors of the pre-existing electronic checklist or pre-existing electronic checklist template. The generated first electronic checklist template may also include one or more checklist items that are identical or substantially identical to checklist items within the pre-existing electronic checklist or the pre-existing electronic checklist template. The first electronic checklist template generated at step 104 may be displayed to a user on a display device, such as a display device of a client terminal.

Method step 106 comprises receiving user inputs for modifying either or both of format and checklist items within the first electronic checklist template. User inputs may be received through any user interface, such as for example a user interface of a client terminal. Exemplary and non-limiting modifications may include:

- adding, removing, reordering or otherwise altering columns, column properties or column descriptors;
- adding, removing, reordering or otherwise altering checklist items;
- specifying one or more of any system controlled columns intended for inclusion, type of information intended to be entered in the system controlled columns, and any predefined system behaviour rules intended to be associated with the system controlled columns (all of which are described in further detail below)
- adding drop down lists associated with a data field corresponding to a checklist item;
- grouping checklist items into sections; and
- providing section descriptors in respect of one or more groups of checklist items;

Step 108 comprises generating a modified electronic checklist template based on user modifications to the first electronic checklist template. The modified electronic checklist template resulting from step 108 defines format and checklist items for an electronic checklist template that is intended to be implemented within a database system.

At step 110, the modified electronic checklist template may be communicated to an electronic checklist application software (henceforth "electronic checklist application"). The electronic checklist application may be located locally on the same terminal as the template editor, or may be located remotely, such as for example at an application server or on another client terminal. In the event the electronic checklist application is located remotely, the modified electronic checklist template may be communicated to the electronic checklist application over a communication network, such as a local area network, the interne, or any other internetwork.

At step 112 the electronic checklist application encodes the communicated electronic checklist application template using a document markup language to generate a database implemented electronic checklist template. The database implemented electronic checklist template so generated includes format and contents of the modified electronic checklist template received from the template editor. Generation of the database implemented electronic checklist template may comprise parsing information relating to structure, format and content of the modified electronic checklist template received from the template editor, and encoding such information in a markup language.

For the purposes of the present invention, the term "markup language" may be understood to describe any declarative programming language that defines a document's structure and other attributes. Non-limiting examples of markup languages capable of being implemented at step 112 include HTML, ASN.1, Candle Markup, EBML, GML, SGML, XML, and XAML. In a particularly preferred embodiment of the invention the markup language of step 112 is a markup language optimized for webpage creation. In a specific implementation of the invention, the method uses HTML to encode the modified electronic checklist template received from the template editor, to generate the database implemented electronic checklist template at step 112.

In an embodiment of the invention, one or both of format and content of the database implemented electronic checklist template may be identical or substantially identical to format and content of the modified electronic checklist template received from the template editor.

In another embodiment, in generating the database implemented electronic checklist template, the electronic checklist application may include one or more system controlled columns for recording certain system information, or for displaying system controlled options in connection with an updated checklist item. In an embodiment of the invention, a system controlled column may record data identifying one or more of, identity of a user updating or modifying a checklist item data field, date of modification or time of modification. The electronic checklist application may be configured such that data fields within system controlled columns may be automatically populated in response to user inputs updating a checklist item. By automatically populating data fields within the system controlled columns with information regarding identity of the modifying user, and date and/or time of modification, the electronic checklist application enables reliable monitoring and auditing of data recordal within each checklist instance of a database implemented electronic checklist template—with consequent improvements in traceability and accountability. In another embodiment of the invention, any or all columns of the database implemented electronic checklist template may be system controlled columns, having associated predefined system behaviour rules to control system behaviour in respect of those system controlled columns.

Generation of a markup language encoded database implemented electronic checklist template at step 112 may include generating program code for achieving data storage of input data received through a checklist instance of the database implemented electronic checklist template. In an embodiment of the invention, said program code associated with the database implemented electronic checklist template may include code generated in a database query language, such as for example structured query language (SQL). In an embodiment of the invention wherein the database implemented electronic checklist template includes one or more system controlled columns, generation of the markup language encoded database implemented electronic checklist template may additionally include generating program code for automatic population of system controlled columns by the electronic checklist application in response to user input modifying data corresponding to a checklist item.

By configuring the electronic checklist application to generate program code for data storage of input data, the invention obviates the need for a user to have specialized knowledge of programming or database query languages and enables users to customize and generate database implemented electronic checklist templates based on familiarity with a template editor. Additionally, where the template editor provides an environment capable of generating layouts for electronic checklist templates in a spreadsheet or tabular form, the designer is afforded the ability to visualize appearance of an instance of the electronic checklist template under design.

FIG. 2 illustrates an exemplary modified electronic checklist template generated at a template editor in accordance with steps 106 and 108 of FIG. 1. The illustrated modified electronic checklist template includes columns C1 to C11, wherein:

- Column C1 records a sequence number of each checklist item
- Column C2 provides a descriptor checklist items
- Column C3 describes an activity categorization for checklist items
- Colum C4 provides a status evaluation for checklist items, in terms of a "pass"/"fail" evaluation Column C5 describes priority or severity for checklist items, in terms of "high", "medium" and "low" priority or severity.

Columns C6, C7, C10 and C11 comprise columns to which specific column descriptors have not been assigned, and which are therefore not intended for display through the electronic checklist application Column C8 describes any corrective actions required in connection with checklist items Column C9 describes responsibility for activities corresponding to a checklist item Electronic checklists implemented in accordance with embodiments of the present invention may be configured to any domain or application, including industrial automation, industrial plants, manufacturing lines, operations centres, field sites, airports, airline operation centres, safety, mechanical or electronic servicing industries, hospitals or health care industries. By way of example, the modified electronic checklist template illustrated in FIG. 2 provides for recording event data associated with operations within an industrial plant.

The illustrated modified electronic checklist template of FIG. 2 also includes section groupings of checklist items within sections S1, S2 and S3, wherein each of sections S1, S2 and S3 is preceded by a corresponding section header data field SH1, SH2 and SH3. It will be understood that checklist items may be grouped in accordance with user preferences. Exemplary embodiments of section based grouping of checklist items may include grouping of checklist items based on one or more of equipment type, functional locations or areas within an industrial plant, type of event associated with checklist items, or processes or functionalities associated with checklist items.

Each column and row descriptor within FIG. 2 includes at least one descriptor within angled parentheses, and in certain cases also includes a descriptor outside the angled parentheses. The column and row descriptors within angled parentheses represent an internal descriptor which is used by the electronic checklist application to name database control objects corresponding to described column or row. In an embodiment, the internal descriptor is not displayed to an end user when displaying a database implemented electronic checklist template that has been generated based on the corresponding modified electronic checklist template, or when displaying a checklist instance that is eventually generated based on such database implemented electronic checklist template.

The additional descriptor outside of the angled parentheses represents an external descriptor corresponding to the associated column or row, which external descriptor may be visually displayed to an end user when displaying a database implemented electronic checklist template that has been generated based on the corresponding modified electronic checklist template, or in displaying a checklist instance that is eventually generated based on such database implemented electronic checklist template.

In a specific embodiment of the invention, internal descriptors may not include any whitespace delimiters, since each internal descriptor is used to name a database control object corresponding to the associated column or row, and since inclusion of a whitespace delimiter would interfere with such naming.

In an embodiment of the invention, the electronic checklist application may be configured such that, in displaying a database implemented electronic checklist template, or in displaying a checklist instance based on a database implemented electronic checklist template, columns or rows that do not include an external descriptor would not be displayed or offered for data input to a user. For example, in the modified electronic checklist template illustrated in FIG. 2, columns C7, C10 and C11 do not include external descriptors (i.e. descriptors outside the angled parentheses). In displaying a database implemented electronic checklist template generated based on this modified electronic checklist template, or in displaying a checklist instance generated from such database implemented electronic checklist template, the electronic checklist application may be configured not to display columns C7, C10 and C 11, or alternatively may restrict data input permissions for such columns.

In addition to the above, it will be noted from FIG. 2 that certain internal descriptors include the term "list" while others include the term "text". For the purposes of the embodiment illustrated in FIG. 2, the terms "list" and "text" identify respectively, columns which enable user data inputs through drop down lists, and columns which enable user data inputs through free text entry.

In the modified electronic checklist template illustrated in FIG. 2, columns C4 and C5 are configured as drop down columns for receiving user inputs, with definitions for the corresponding drop down list options being provided in region $D_{Def}$. Region $D_{Def}$ comprises rows DDL1 and DDL2. Row DDL1 includes drop down list options corresponding to column C4 and row DDL2 includes drop down list options corresponding to column C5. It will be understood that the FIG. 2 format for defining drop down list options is only illustrative, and that the invention can equally adopt any other format or inbuilt function specific to the template editor in use. In the illustrated embodiment, rows DDL1 and DDL2 include internal descriptors in the format <Options: n:xxx>. The first part of the descriptor within the angled parentheses (i.e. "Options") is an identifier which specifies that contents of said row comprise drop down list options for a column within the electronic checklist template. The second part of the descriptor within the angled parentheses (i.e. "n") is a numerical value identifying the number of drop down options that the list requires to provide for. In both of rows DDL1 and DDL2, n is assigned the value 4, thereby specifying that the drop down lists respectively associated with said rows each provide 4 drop down options. The third part of the descriptor within the angled parentheses (i.e. "xxx") provides the internal name of the column to which the drop down list definition corresponds. For example, row DDL1 corresponds to the "Status" column (i.e. column C4), while row DDL2 corresponds to the "Priority" column (i.e. column C5).

FIG. 2A illustrates another exemplary modified electronic checklist template generated at a template editor in accordance with steps 106 and 108 of FIG. 1, wherein in addition to all other columns, rows, data fields and content discussed in connection with FIG. 2, the illustrated modified electronic checklist template additionally includes columns C12 and C13, wherein:

Column C12 is titled "Modified By" and records the identity of a user modifying, updating or entering data in respect of any checklist item Column C13 is titled "Modified Date" and records date and/or time of modification or data entry by the user Columns C12 and C13 correspond to system controlled columns incorporated within the modified electronic checklist template by a user designing said modified electronic checklist template, which system controlled columns are intended for automatic population by the system in response to user inputs modifying or updating a checklist item within each checklist instance of a database implemented electronic checklist that is based on said modified electronic checklist template.

Figure 3:
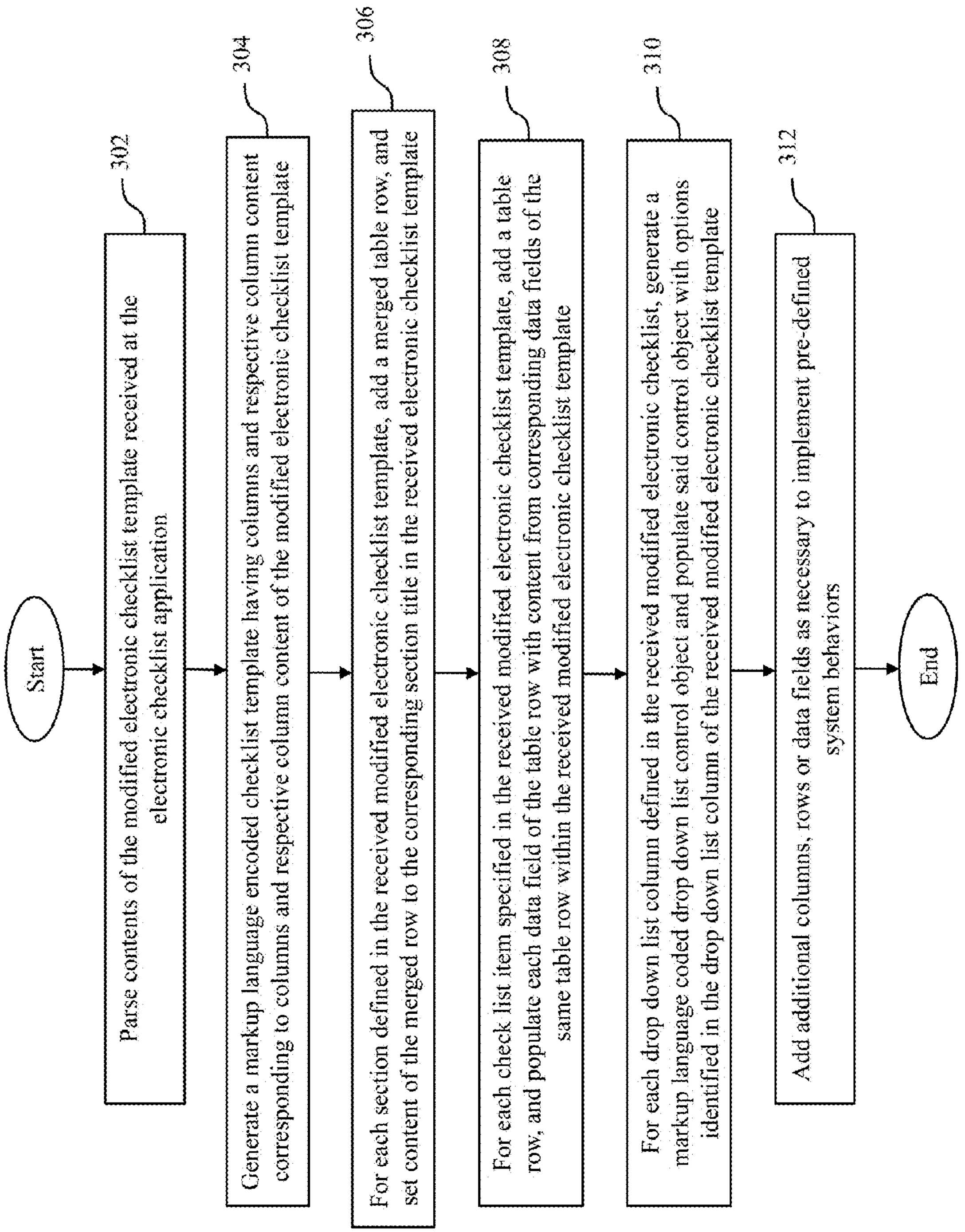
FIG. 3 illustrates a method for generating a markup language encoded database implemented electronic checklist.

FIG. 3 illustrates a method embodiment for generating a markup language encoded database implemented electronic checklist template based on a modified electronic checklist template communicated from the template editor to the electronic checklist application.

At step 302, the electronic checklist application parses contents of the modified electronic checklist template received from the template editor. Parsing contents of the modified electronic checklist template may be achieved by any one of several known or available parsing algorithms.

Step 304 uses a markup language to define a template (e.g. a table) having columns and respective column content corresponding to columns and respective column content of the received modified electronic checklist template. In an embodiment, the electronic checklist application may be configured such that in generating the markup language encoded table, it may omit to include columns from the modified electronic checklist template which do not have an external descriptor. In another embodiment of method step 304, the electronic checklist application may be configured such that the generated markup language encoded table includes columns of the modified electronic checklist template which do not have an external descriptor, while simultaneously ensuring that such columns would not be eligible for display to a user.

At step 306, for each section defined in the received modified electronic checklist template, the electronic checklist application adds a merged table row within the markup language defined table, and sets content of the merged row to correspond to section title of said section as provided within the modified electronic checklist template.

In step 308, for each checklist item included within the received modified electronic checklist template, the electronic checklist application adds a corresponding table row and populates each data field of the table row with content from corresponding data fields of the same table row within the received modified electronic checklist template. Thereafter at step 310, for each drop down list column defined in the received modified electronic checklist template, the electronic checklist application generates a markup language coded drop down list control object, and populates said control object with options identified in the drop down list column of the received modified electronic checklist template.

As shown in step 312, the method may also comprise adding, removing or altering any columns, rows or data fields as may be necessary to configure the database implemented electronic checklist template to implement predefined system behaviour based on predefined system behaviour rules associated with the electronic checklist application. The predefined system behaviour rules comprise one or more rules or instructions which cause a system to implement a predefined system behaviour in response to an associated event trigger. For example, in response to user modification of a checklist item (i.e. the event trigger) a system behaviour rule associated with said event trigger may cause the system to respond by recording the identity of the modifying user, and date of modification (i.e. the predefined system behaviour). Step 312 may additionally include generating markup language coded instructions associated with such additions, removals or alterations, as may be necessary to achieve said predefined system behaviour. Non-limiting examples of predefined system behaviour may include:

- adding one or more system controlled columns to a markup language encoded table;
- auto-populating one or more system controlled columns in response to selection, modification or an update to a corresponding checklist item;
- auto-populating or calculating data for one or more data fields within a system controlled column based on input received in connection with any other data field or system controlled column—which auto-population or calculation may in an embodiment be based on any logic, function, method. formulae or data retrieved from one or more systems or data sources;
- responsive to a user within an organization seeking to assign responsibility for a checklist item to another user, displaying to the assigning user, a drop down list of subordinates or colleagues to whom responsibility may be assigned, and generating an automatic notification to the assignee who is eventually selected by the user;
- generating notifications or alerts to one or more recipients if a user input in connection with a checklist item satisfies one or more predefined event triggers;
- automatic assignment of execution responsibility or supervisory responsibility for a checklist item responsive to user input in connection with said checklist item satisfying one or more predefined event triggers; and
- validation checks of user input data in connection with a checklist item, based on predefined data validation rules specified in connection with said checklist item. In an embodiment, data validation rules may check to ensure that input data conforms to acceptable values of input date. By way of a non-limiting example, in a data field configured to accept input data corresponding to a date in the format dd/mm/yyyy, data validation rules may check to ensure that user input corresponds entirely of numeric values, and that $0<dd\leq31$ and $0<mm\leq12$.

While step 312 is illustrated as the final chronological step in the method of FIG. 3, the step of implementing system behaviour can in fact be executed at any stage (or at multiple stages) of the method.

Figure 4A:
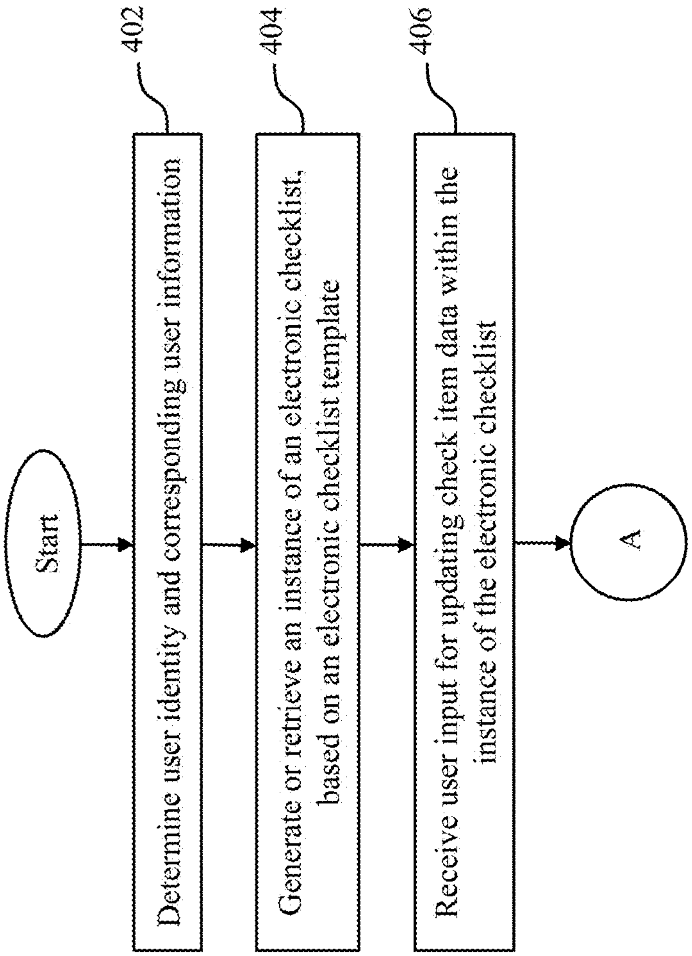
FIGS. 4A and 4B illustrate a method of implementing predefined system behaviour in an electronic checklist template.
Figure 4B:
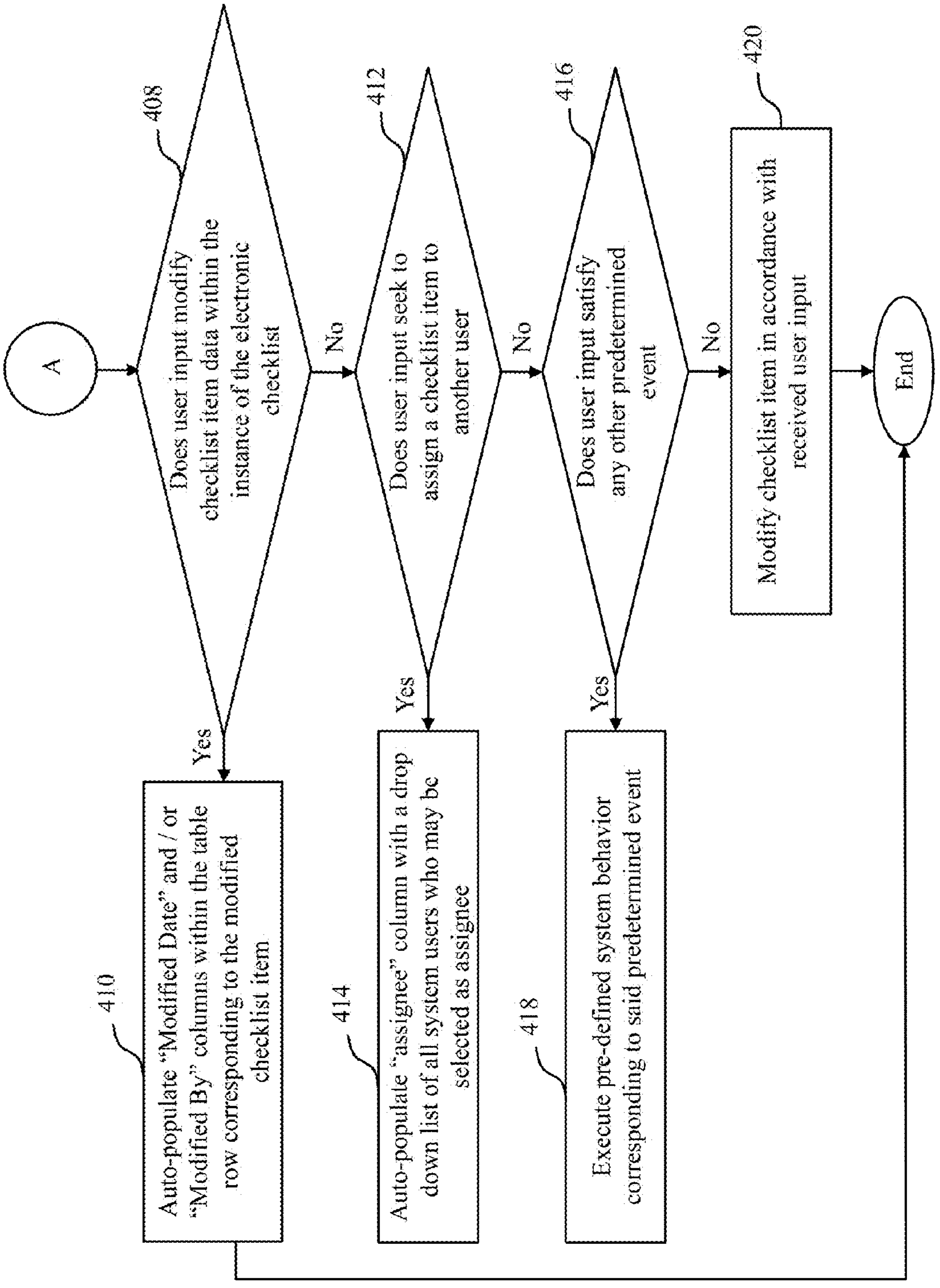

FIGS. 4A and 4B illustrate a particular embodiment of the invention wherein the electronic checklist application has been configured to implement one or more predefined system behaviours.

At step 402, the electronic checklist application determines identity of the user seeking to update or modify a checklist item data field, and corresponding user information. For the purposes of the present invention, "checklist item data field" may be understood as any field within an electronic checklist template or an instance of an electronic checklist template, that is configured for data entry or for receiving user input in connection with the electronic checklist template or instance of an electronic checklist template. By way of example, referring to the electronic checklist template illustrated in FIG. 2, each tabular intersection of columns C4, C5, C8 and C9 with any of rows within Section 1: Sequence Nos. 1 to 4, Section 2: Sequence Nos. 1 to 4 and Section 3: Sequence Nos. 1 to 3 comprises an individual data field that may be configured for data entry or for receiving user input in connection with the electronic checklist template or instance of the electronic checklist template. The user identity may for example, be determined based on any one or more of user login information, any other access authorization information received from the user, or information relating to the client terminal from which the user accesses the electronic checklist application.

The user may at step 404 generate or retrieve an instance of an electronic checklist template, which instance has been generated based on a database implemented electronic checklist template created in accordance with the methods discussed above. Step 406 thereafter comprises receiving input from the user for updating at least one checklist item within the electronic checklist instance.

At step 408 the electronic checklist application ascertains whether a received user input modifies a checklist item, and if so, at step 410 auto-populates "Modified Date" and "Modified By" columns corresponding to the modified checklist item within the electronic checklist instance.

At step 412 the electronic checklist application ascertains whether the user input seeks to assign responsibility for a checklist item to another user, and if so, at step 414 auto-populates the "Assignee" column with a drop down list of all system users who may be selected as an assignee (such as for example all subordinates or all departmental peers of the modifying user).

At step 416, the electronic checklist application ascertains whether the received user input satisfies any other predetermined event trigger, and if so, at step 418 executes a predefined system behaviour corresponding to such predetermined event.

At step 420, the electronic checklist application may then modify the specific checklist item as may be required in accordance with the received user input.

It would be understood that event triggers for any system behaviour, and also the system behaviour corresponding to an event trigger may be prescribed within a set of rules associated with the electronic checklist application. Additions, removals or modifications to the set of rules to modify event triggers or system behaviour corresponding to such event triggers, may be carried out at any time to modify system behaviour of the electronic checklist application.

Figure 5A:
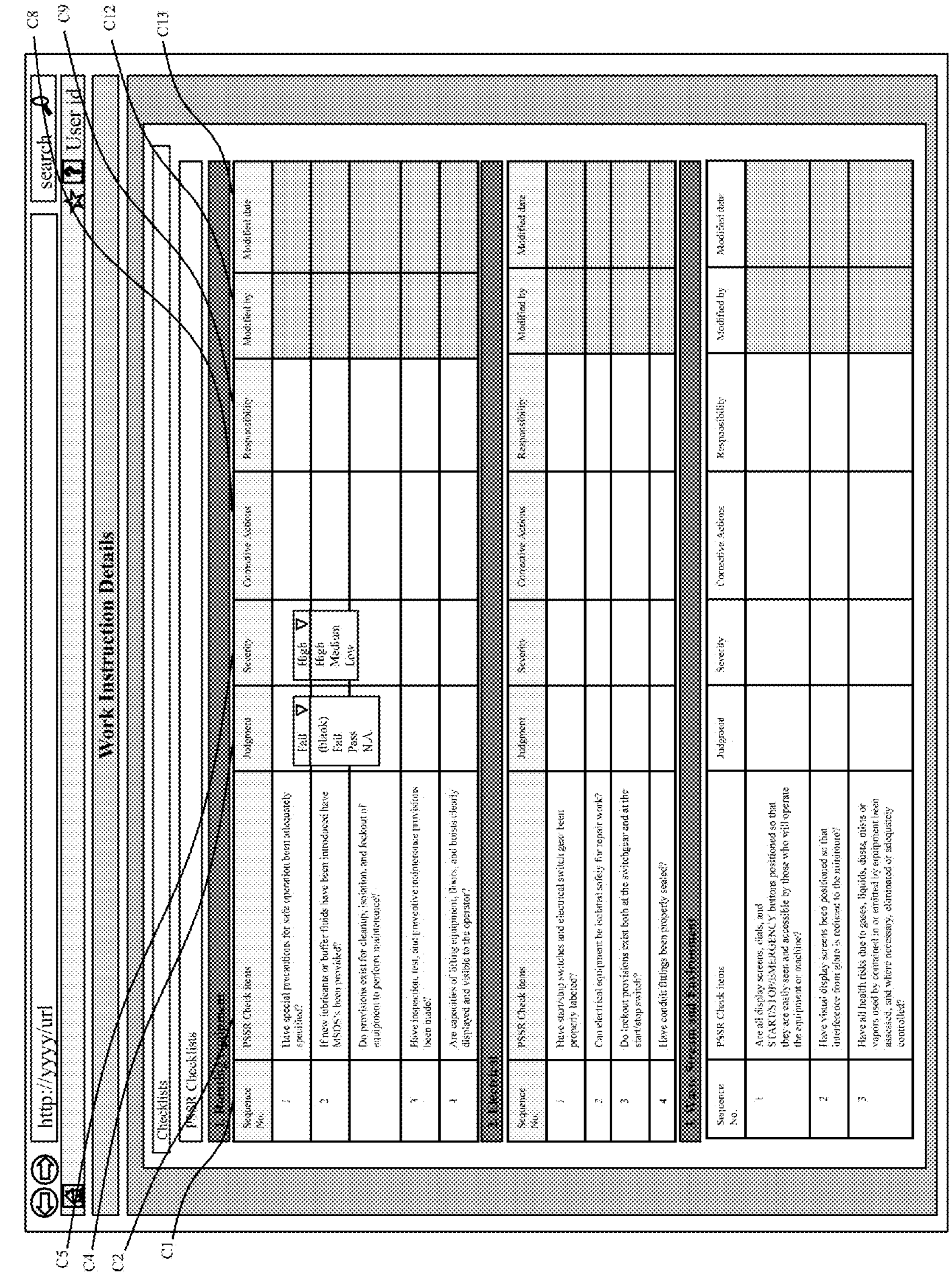
FIGS. 5A and 5B illustrate interface display screens of an electronic checklist application.

FIG. 5A illustrates an interface display screen of the electronic checklist application, displaying an exemplary database implemented electronic checklist template. The exemplary database implemented electronic checklist comprises a markup language encoded database implemented electronic checklist template that has been generated based on the modified electronic checklist template previously illustrated in FIG. 2A. It will be observed that the database implemented electronic checklist template of FIG. 5A includes columns C1 (sequence number), C2 (checklist item descriptor), C4 (status evaluation/judgement), C5 (priority/severity), C8 (corrective action) and C9 (responsibility) as previously defined in the modified electronic checklist template of FIG. 2A.

It will be noted that in generating the database implemented electronic checklist template, the electronic checklist application has converted the drop down list options described in region $D_{Def}$ of FIG. 2A into drop down lists within the appropriate columns of the database implemented electronic checklist template. In an embodiment, this conversion may be achieved using markup language encoding, such as for example by HTML encoding.

Additionally, in generating the database implemented electronic checklist template illustrated in FIG. 5A, the electronic checklist application has added two additional system controlled columns C12 and C13, for respectively recording the identity of the user who last updated a checklist item or checklist item data field, and the date of the update. System controlled columns may be auto-populated by the electronic checklist application upon selection of a specific checklist item or upon receipt of an update in connection with a specific checklist item. As shown in the illustration of FIG. 5A, the electronic checklist application may "gray out" system controlled columns such as C12 and C13 to indicate that such columns are not editable or operable upon by the user. Column properties of system controlled columns such as C12 and C13 may additionally be set to prevent user input based updates or modifications to data fields within said system controlled columns. It would be understood that system controlled columns in an electronic checklist template may be generated responsive to user inputs specifying generation of such columns, or responsive to coded instructions controlling the electronic checklist application.

Figure 5B:
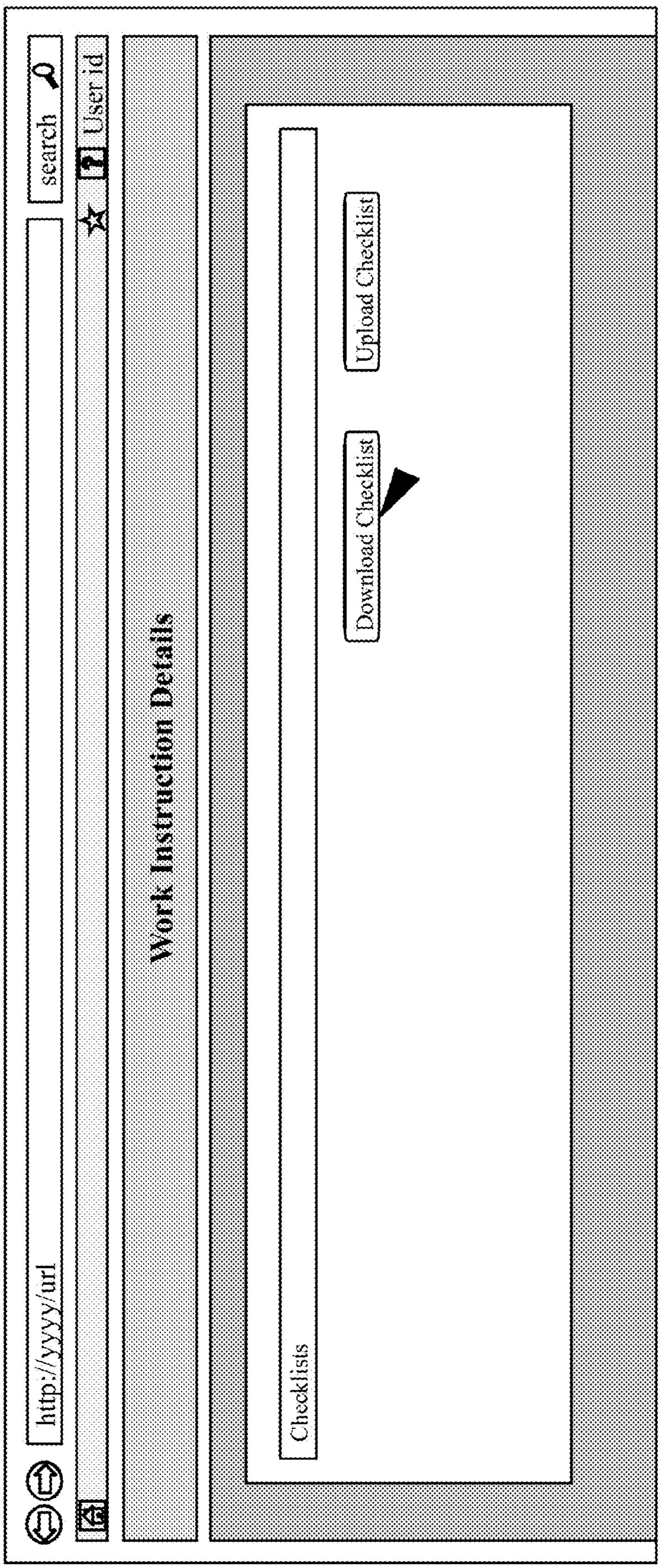

Additionally, the electronic checklist application and the database implemented electronic checklist template illustrated in FIG. 5A are shown as being accessed through a web browser at a client terminal. It would however be understood that the electronic checklist application may equally comprise a standalone software application capable of direct or network delivery of electronic checklist templates or electronic checklists to a user at a client terminal FIG. 5B illustrates another exemplary interface display screen of the electronic checklist application, with selectable options for downloading and uploading checklists. The upload option enables modified electronic checklist templates to be uploaded to the application from the template editor, for subsequent parsing of contents and generation of markup language encoded database implemented electronic checklist templates.

The download option enables a user to download a blank, or pre-existing electronic checklist template from a database, and access the downloaded template through the template editor to generate a modified electronic checklist template, for subsequent conversion to a database implemented electronic checklist template.

FIG. 5C illustrates an exemplary blank electronic checklist template of the type that may be downloaded from a database for further editing or modifications within the template editor. In an embodiment of the invention, selecting the download option may result in download of a template corresponding to the electronic checklist that has been most recently updated at the electronic checklist application.

Figure 6A:
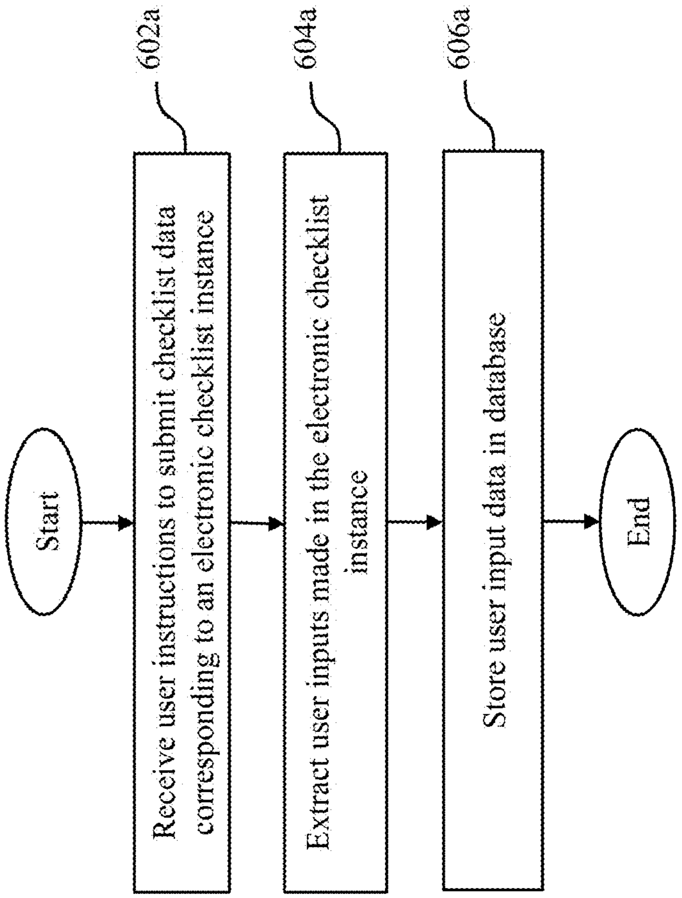
FIGS. 6A and 6B illustrate data persistence techniques implemented by an electronic checklist application.
Figure 6B:
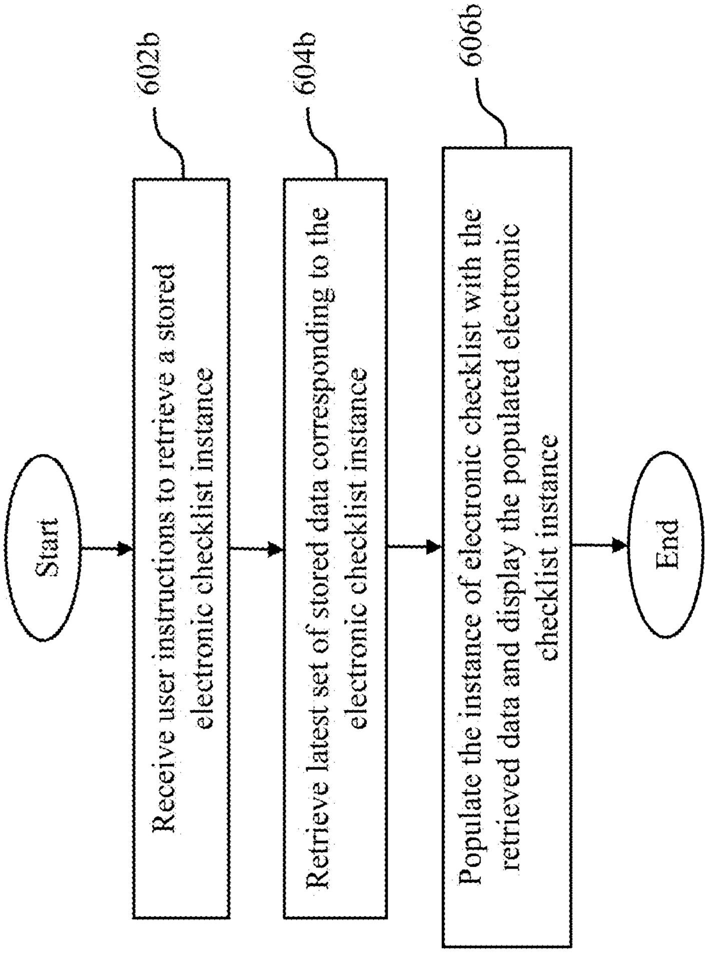

The electronic checklist application may additionally implement data persistence for ensuring non-transitory storage of data received by way of user inputs in connection with an electronic checklist instance. FIGS. 6A and 6B respectively illustrate method embodiments of data persistence techniques that may be implemented by the electronic checklist application.

In FIG. 6A at step 602*a*, the electronic checklist application receives user instructions to save or otherwise submit checklist data corresponding to a specific instance of an electronic checklist. Step 604*a* comprises extracting user inputs from the electronic checklist instance, whereafter, at step 606*a* the extracted user inputs are stored within a database. It would be understood that storage of extracted user inputs within a database may be achieved by the electronic checklist application directly from the client terminal, or may involve communication of such user inputs to a server, which server achieves subsequent storage of the data within a database.

FIG. 6B illustrates a method of data retrieval that may be implemented by the electronic checklist application. At step 602*b* the electronic checklist application receives user instructions to retrieve a stored instance of an electronic checklist. Step 604*b* retrieves the latest set of stored checklist item data corresponding to the specific electronic checklist instance. Step 606*b* thereafter populates the electronic checklist instance with the retrieved data and displays the populated electronic checklist instance at a client terminal.

Figure 7A:
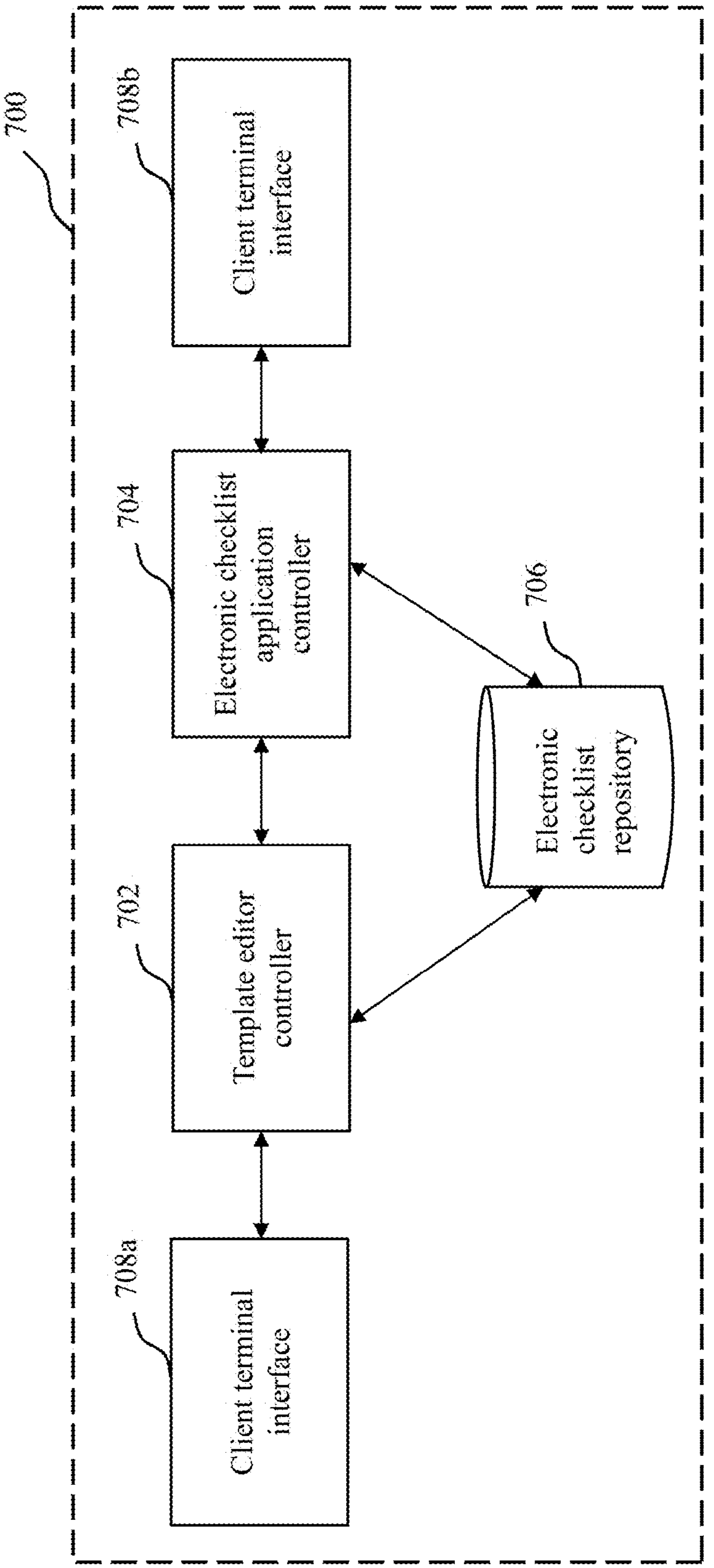
FIG. 7A illustrates an exemplary system of the invention.

FIG. 7A illustrates an exemplary system 700 of the invention, comprising template editor controller 702, electronic checklist application controller 704, electronic checklist repository 706 and client terminal interfaces 708*a* and 708*b*.

Template editor controller 702 comprises a processing device configured to control the template editor presented to a user for defining (and thereafter generating) an electronic checklist template according to the methods described in more detail hereinabove. The template editor controller 702 may be configured to control the editor environment presented to a user on a visual display device, and for controlling input-output functions through client terminal interface 708*a*. Template editor controller 702 may additionally be in communication with electronic checklist repository 706, from where it may retrieve pre-existing electronic checklist templates for further editing or modification. Electronic checklist repository 706 may be configured to store database implemented electronic checklist templates as well as electronic checklist instances. In an embodiment, electronic checklist repository 706 may include one or more tables for storing database implemented checklist templates, and one or more other tables for storing checklist instances based on database implemented electronic checklist templates. In an embodiment of the invention, each checklist instance is assigned a unique checklist instance identifier, and is stored within electronic checklist repository 706 in unique association with said checklist instance identifier. Template editor controller 702 may also be in direct or network communication with electronic checklist application controller 704.

Electronic checklist application controller 704 may be configured for one or more of (i) receiving a modified electronic checklist template from template editor controller 702 (ii) encoding a communicated electronic checklist application template using a document markup language to generate a database implemented electronic checklist template (iii) adding system controlled columns, rows or data fields to the database implemented electronic checklist template (iv) encoding within the database implemented electronic checklist template, system behaviours for responding to predefined event triggers (v) storing database implemented electronic checklist templates in electronic checklist repository 706 (vi) generating checklist instances of database implemented electronic checklist templates retrieved from electronic checklist repository 706 (vii) controlling input-output functions and receiving user inputs for updating checklist items through client terminal interface 708*b*.

It would be understood that the system may include one or more than one client terminal interfaces. In an embodiment, a client terminal interface may be configured to enable a user to design or modify electronic checklist templates using a template editor, and to enable a user to generate a checklist instance based on a database implemented electronic checklist template and/or to enter data using such checklist instance. In another embodiment, the system may provide two separate client terminal interfaces, each configured for one of (i) enabling a user to design or modify electronic checklist templates using a template editor, and (ii) enabling a user to generate a checklist instance based on a database implemented electronic checklist template and/or to enter data using the generated checklist instance. It would additionally be understood that depending on the embodiment, a user designing a checklist template, and a user generating a checklist instance or entering data therein, may be the same user, or may be different users.

Figure 7B:
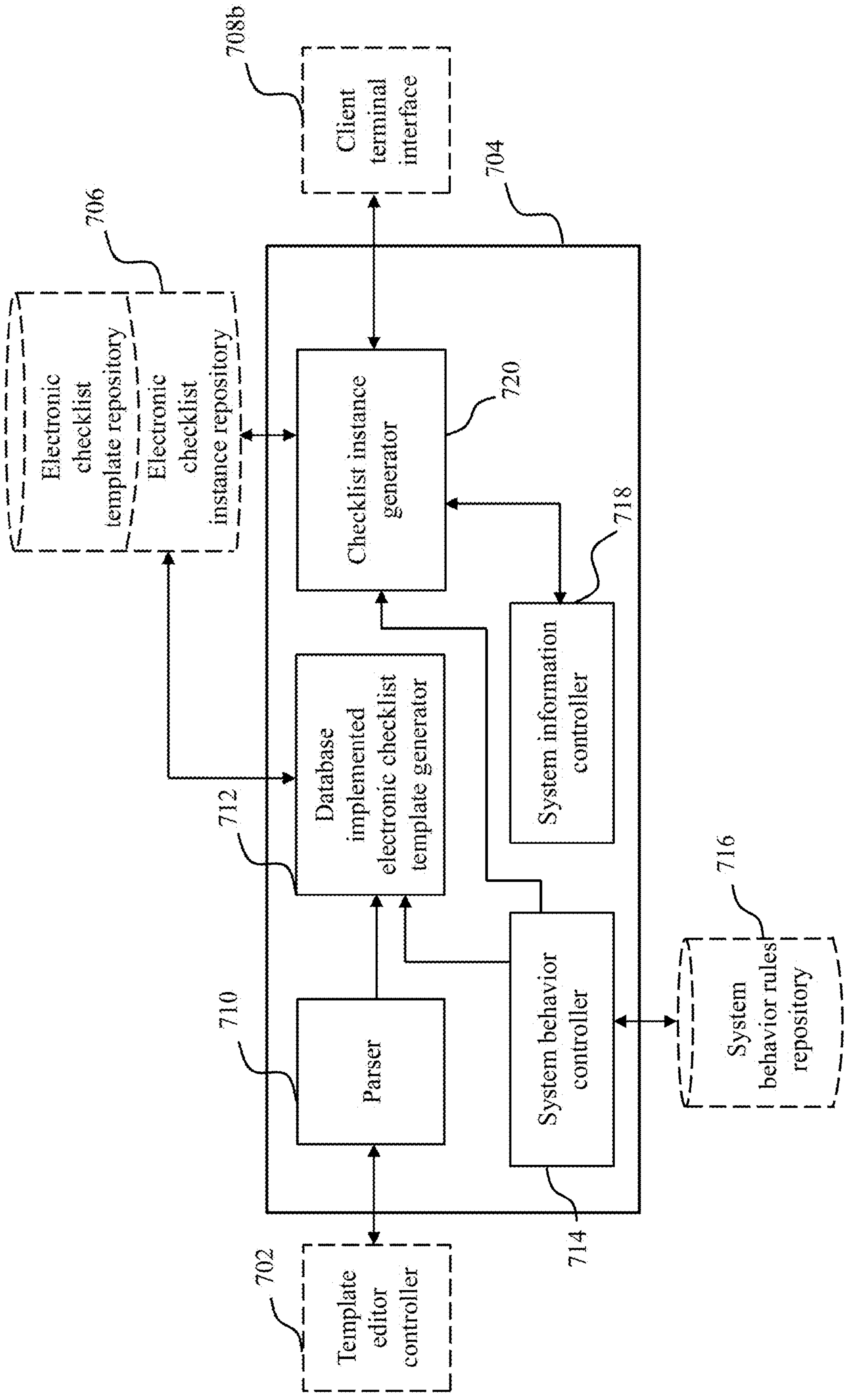
FIG. 7B illustrates an embodiment of an electronic checklist application controller.

FIG. 7B illustrates a specific embodiment of electronic checklist application controller 704, comprising parser 710, database implemented electronic checklist template generator 712, system behaviour controller 714, system information controller 718 and checklist instance generator 720, which components may be configured to enable the various functions of electronic checklist application controller 704.

In the embodiment illustrated in FIG. 7B, parser 710 may be configured to receive from template editor controller 702, a modified electronic checklist template. Parser 710 parses contents of the received modified electronic checklist template, which parsed contents are passed on to database implemented electronic checklist template generator 712. Database implemented electronic checklist template generator 712 additionally receives inputs from system behaviour controller 714, defining specific system behaviours that require to be encoded along with the parsed contents received from parser 710. System behaviour controller 714 determines specific system behaviours and corresponding event trigger definitions, for onward communication to database implemented electronic checklist template generator 712. The determination of system behaviours and event triggers by system behaviour controller 714 may be based on one or more predefined system behaviour rules retrieved from system behaviour rules repository 716.

Database implemented electronic checklist template generator 712 thereafter generates a database implemented electronic checklist template by encoding the parsed contents received from parser 710 wherein the encoding uses a markup language. The database implemented electronic checklist template thus generated may be stored in electronic checklist repository 706 for subsequent retrieval. In an embodiment of the invention, when generating a database implemented electronic checklist template, database implemented electronic checklist template generator 712 also encodes system behaviour information and/or system behaviour rules received from system behaviour controller 714.

Electronic checklist application controller 704 may additionally include checklist instance generator 720 configured to generate electronic checklist instances based on database implemented electronic checklist templates retrieved from electronic checklist repository 706. Checklist instance generator 720 may be in communication with system behaviour controller 714 and system information controller 718, and may receive from system information controller 718 one or more system information parameters (such as for example, data identifying one or more of, a user modifying the electronic checklist, and/or date of modification or time of modification of a checklist item) for addition to system controlled columns corresponding to a checklist instance, in response to user inputs updating a checklist item. The system information parameter is any information parameter available at the client terminal 708*a* and or 708*b*. In an embodiment, system behaviour information and system behaviour rules may be communicated from system behaviour controller 714 to checklist instance generator 720, wherein checklist instance generator applies the received predefined system behaviour information and predefined system behaviour rules into an electronic checklist instance, when generating said electronic checklist instance.

Electronic checklist application controller 704 may be additionally be configured to display generated checklist instances at client terminal interface 708*b*, and to receive through client terminal interface 708*b*, user inputs updating a checklist instance. In an embodiment of the invention, checklist instances and updates to checklist instances may be communicated and stored by electronic checklist application controller 704 in electronic checklist repository 706.

With reference to FIGS. 7A and 7B hereinabove, it would be understood that the various system components discussed above may be individually or collectively configured to implement the various method embodiments of the invention discussed in greater detail hereinabove.

Figure 8:
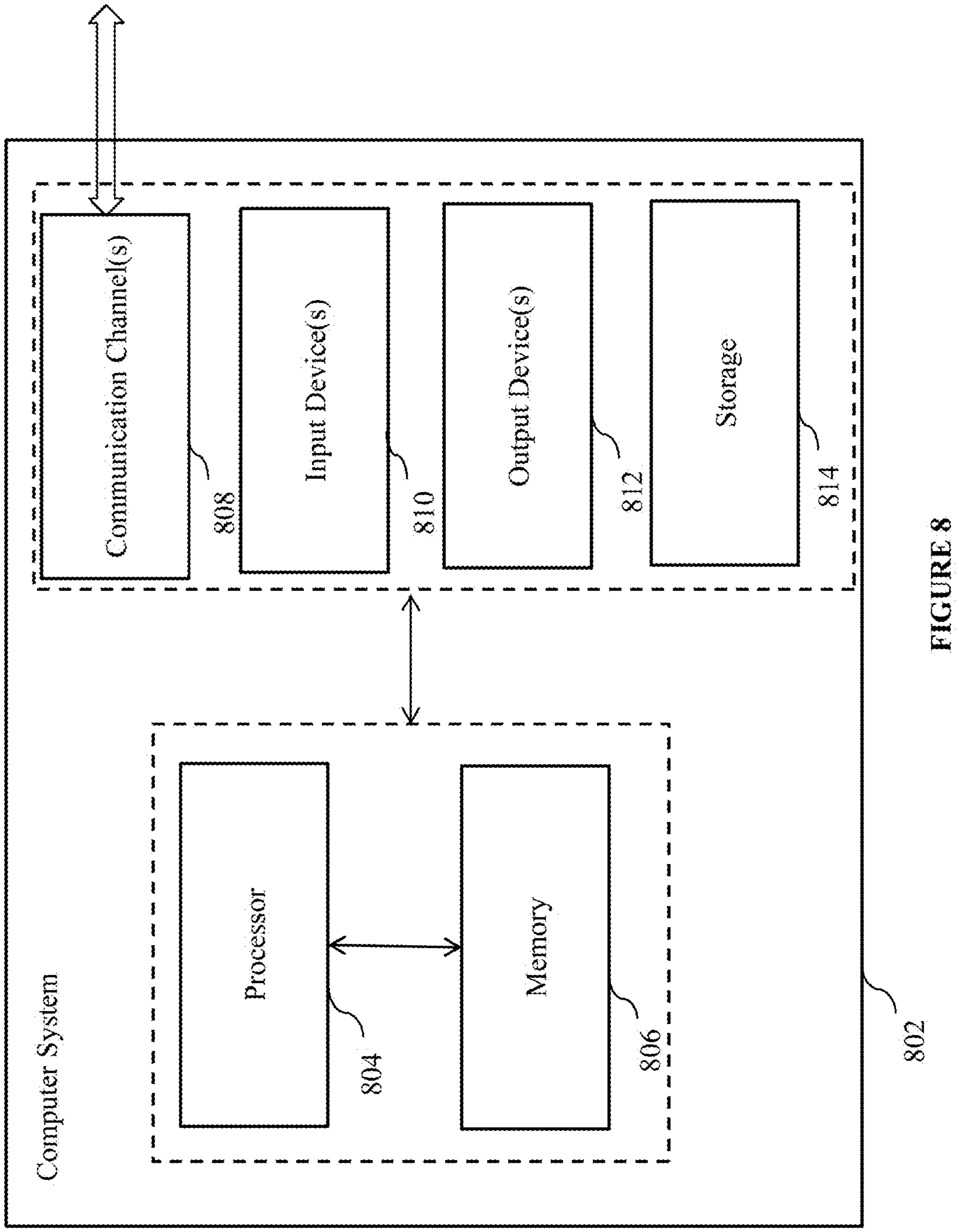
FIG. 8 illustrates an exemplary computing system in which embodiments of the invention may be implemented.

FIG. 8 illustrates an exemplary computing system in which various embodiments of the invention may be implemented.

The system 802 comprises at-least one processor 804 and at-least one memory 806. The processor 804 executes program instructions and may be a real processor. The processor 804 may also be a virtual processor. The computer system 802 is not intended to suggest any limitation as to scope of use or functionality of described embodiments. For example, the computer system 802 may include, but not limited to, one or more of a general-purpose computer, a programmed microprocessor, a micro-controller, an integrated circuit, and other devices or arrangements of devices that are capable of implementing the steps that constitute the method of the present invention. Exemplary embodiments of a system 802 in accordance with the present invention may include one or more servers, desktops, laptops, tablets, smart phones, mobile phones, mobile communication devices, tablets, phablets and personal digital assistants. In an embodiment of the present invention, the memory 806 may store software for implementing various embodiments of the present invention. The computer system 802 may have additional components. For example, the computer system 802 includes one or more communication channels 808, one or more input devices 810, one or more output devices 812, and storage 814. An interconnection mechanism (not shown) such as a bus, controller, or network, interconnects the components of the computer system 802. In various embodiments of the present invention, operating system software (not shown) provides an operating environment for various softwares executing in the computer system 802 using a processor 804, and manages different functionalities of the components of the computer system 802.

The communication channel(s) 808 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 810 may include, but not limited to, a touch screen, a keyboard, mouse, pen, joystick, trackball, a voice device, a scanning device, or any another device that is capable of providing input to the computer system 802. In an embodiment of the present invention, the input device(s) 810 may be a sound card or similar device that accepts audio input in analog or digital form. The output device(s) 812 may include, but not limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 802.

The storage 814 may include, but not limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 802. In various embodiments of the present invention, the storage 814 contains program instructions for implementing the described embodiments.

In an embodiment of the present invention, the computer system 802 is part of a distributed network where various embodiments of the present invention are implemented for rapidly developing end-to-end software applications.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 802. The method described herein is typically implemented as a computer program product, comprising a set of program instructions which is executed by the computer system 802 or any other similar device. The set of program instructions may be a series of computer readable codes stored on a tangible medium, such as a computer readable storage medium (storage 804), for example, diskette, CD-ROM, ROM, flash drives or hard disk, or transmittable to the computer system 802, via a modem or other interface device, over either a tangible medium, including but not limited to optical or analogue communications channel(s) 808. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The methods, systems and computer program products discussed in detail hereinabove, enable a user to modify and port pre-existing checklist templates to a database system without specialized coding or database programming skills. Additionally, the invention enables delivery of electronic checklists encoded in a platform neutral markup language to any processing device or mobile communication device over a communication network. The electronic checklists so delivered may be accessed and updated by a user over a web browser available on the processing device or mobile communication device. By providing for specific automated system behaviours in response to predefined event triggers, and by providing for auto-populating system controlled columns within an electronic checklist with system information such as date/time of last modification and identity of modifying user, the invention enhances ease of use, as well as audit capabilities in connection with updates made to electronic checklists.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method for database implementation of electronic checklists, the method comprising implementing using at least one processor, the steps of:

displaying at a user interface, a first electronic checklist template within a template editor;

defining a modified electronic checklist template, wherein defining the modified electronic checklist template comprises modifying the first electronic checklist template based on inputs received at the template editor; and generating a database implemented electronic checklist template, the database implemented electronic checklist template comprising:

a markup language encoding of the modified electronic checklist template; and at least one system controlled column, wherein data input within data fields of the at least one system controlled column is determined by:

one or more system information parameters; and one or more predefined rules of system behaviour associated with the at least one system controlled column.

2. The method according to claim 1, wherein the first electronic checklist template comprises checklist definition information extracted from a pre-existing checklist template.

3. The method according to claim 1, wherein defining the modified electronic checklist template includes selecting for inclusion within the modified electronic checklist template, a system controlled column within the first electronic checklist template, said system controlled column having one or more predefined rules of system behaviour associated therewith.

4. The method according to claim 1, wherein generating the database implemented electronic checklist template comprises:

parsing content of the modified electronic checklist template;

generating a markup language encoded checklist template comprising columns and column descriptors corresponding to columns and column descriptors parsed from the modified electronic checklist template; and for each checklist item parsed from the modified electronic checklist template, adding a template row to the markup language encoded checklist template and populating the added template row with data fields extracted from the parsed checklist item.

5. The method according to claim 1, wherein generating the database implemented electronic checklist template further comprises one or more of for each section defined in the modified electronic checklist template, adding a merged row to the markup language encoded checklist template, and setting content of the merged row to a corresponding section title parsed from the modified electronic checklist template;

for each drop down list defined in the modified electronic checklist template, generating a drop down list control object and populating the drop down list control object with corresponding drop down options parsed from the modified electronic checklist template; or selecting a system controlled column for inclusion within the modified electronic checklist template, and associating predefined rules of system behaviour with said system controlled column.

6. The method according to claim 1, wherein the system information parameters determining data input within data fields of the at least one system controlled column includes at least one of:

identity of a user updating a checklist item data field;

date of modification of a checklist item data field; and time of modification of a checklist item data field.

7. The method according to claim 1, wherein generating the database implemented electronic checklist template further comprises configuring at least one data field corresponding to a system controlled column within the markup language encoded checklist template, to respond to a predefined event trigger by implementing a predefined system behaviour determined by one or more predefined rules of system behaviour associated with the at least one data field.

8. The method according to claim 7, wherein the predefined system behaviour comprises one of:

responding to input seeking to assign responsibility for a checklist item, by displaying to the assigning user, a drop down list of selectable assignees;

responding to input generated predefined event trigger by generating a corresponding event notification to one or more recipients;

responding to input generated predefined event trigger by assigning responsibility for a specific checklist item to a specified assignee; or responding to input received from the user interface for a checklist item, by executing a data validation check in connection with data submitted by said input, and wherein the data validation check is based on one or more predefined data validation rules associated with the checklist item.

9. The method according to claim 1, further comprising responding to input requesting a checklist instance of the database implemented electronic checklist template by:

retrieving checklist definition information corresponding to the database implemented electronic checklist template;

retrieving one or more predefined rules of system behaviour associated with all system controlled columns within the database implemented electronic checklist template;

and generating a checklist instance for display at the user interface based on the retrieved checklist definition information;

wherein data input within data fields of each system controlled column within the displayed checklist instance is controlled by the retrieved predefined rules of system behaviour associated with said system controlled column.

10. A system for database implementation of electronic checklists, the system comprising:

a processor;

a template editor controller configured to:

display at a user interface, a first electronic checklist template within a template editor define a modified electronic checklist template, wherein the modified electronic checklist template comprises the first electronic checklist template modified based on inputs received at the template editor;

an electronic checklist application controller configured to generate a database implemented electronic checklist template, the database implemented electronic checklist template comprising:

a markup language encoding of the modified electronic checklist template; and at least one system controlled column, wherein data input within data fields of the at least one system controlled column is determined by:

one or more system information parameters; and one or more predefined rules of system behaviour associated with the at least one system controlled column.

11. The system according to claim 10, wherein the template editor controller is configured to display the first electronic checklist template based on checklist definition information extracted from a pre-existing checklist template.

12. The system according to claim 10, wherein the template editor controller is configured to enable selection for inclusion within the modified electronic checklist template, a system controlled column within the first electronic checklist template, said system controlled column having one or more predefined rules of system behaviour associated therewith.

13. The system according to claim 10, wherein the electronic checklist application controller is configured to:
- parse content of the modified electronic checklist template;
- generate a markup language encoded checklist template comprising columns and column descriptors corresponding to columns and column descriptors parsed from the modified electronic checklist template; and
- for each checklist item parsed from the modified electronic checklist template, add a template row to the markup language encoded checklist template and populate the added template row with data fields extracted from the parsed checklist item.

14. The system according to claim 10, wherein the electronic checklist application controller is configured:
- for each section defined in the modified electronic checklist template, to add a merged row to the markup language encoded checklist template, and set content of the merged row to a corresponding section title parsed from the modified electronic checklist template;
- for each drop down list defined in the modified electronic checklist template, to generate a drop down list control object and populate the drop down list control object with corresponding drop down options parsed from the modified electronic checklist template; or
- to select for inclusion within the the markup language encoded checklist template, at least one system controlled column, and associating predefined rules of system behaviour with said system controlled column.

15. The system according to claim 10, wherein the system information parameters determining data input within data fields of the at least one system controlled column includes at least one of:
- identity of a user updating a checklist item data field;
- date of modification of a checklist item data field; and
- time of modification of a checklist item data field.

16. The system according to claim 10, wherein the electronic checklist application controller configures at least one data field corresponding to a system controlled column within the markup language encoded checklist template, to respond to a predefined event trigger by implementing a predefined system behaviour determined by one or more predefined rules of system behaviour associated with the at least one data field.

17. The system according to claim 16, wherein the predefined system behaviour comprises one of:
- responding to input seeking to assign responsibility for a checklist item, by displaying to the assigning user, a drop down list of selectable assignees;
  - responding to input generated predefined event trigger by generating a corresponding event notification to one or more recipients;
    - responding to input generated predefined event trigger by assigning responsibility for a specific checklist item to a specified assignee; or
- responding to input received for a checklist item, by executing a data validation check in connection with data submitted through said input, and wherein the data validation check is based on one or more predefined data validation rules associated with the checklist item.

18. The system according to claim 10, comprising a checklist instance generator configured to respond to input for a checklist instance of the database implemented electronic checklist template by:
- retrieving checklist definition information corresponding to the database implemented electronic checklist template;
- retrieving one or more predefined rules of system behaviour associated with all system controlled columns within the database implemented electronic checklist template;
- and
- generating a checklist instance for display at the user interface based on the retrieved checklist definition information;
- wherein data input within data fields of each system controlled column within the displayed checklist instance is controlled by the retrieved predefined rules of system behaviour associated with said system controlled column.

19. A computer program product for database implementation of electronic checklists, comprising a non-transitory computer-readable storage medium having program code stored therein, the program code comprising computer readable instructions for:
- displaying at a user interface, a first electronic checklist template within a template editor;
- defining a modified electronic checklist template, wherein defining the modified electronic checklist template comprises modifying the first electronic checklist template based on inputs received at the template editor;
- and
- generating a database implemented electronic checklist template, the database implemented electronic checklist template comprising:
  - a markup language encoding of the modified electronic checklist template; and
  - at least one system controlled column, wherein data input within data fields of the at least one system controlled column is defined by:
    - one or more system information parameters; and
    - one or more predefined rules of system behaviour associated with the at least one system controlled column.

* * * * *